Oct. 18, 1966 E. A. DAUBMAN, JR., ETAL 3,279,613
CENTRIFUGALS
Filed Nov. 10, 1964 4 Sheets-Sheet 1

INVENTORS.
EDWARD A. DAUBMAN JR.
JOHN W. SHERLOCK
BY
Robertson Smythe & Bryan
ATTORNEYS.

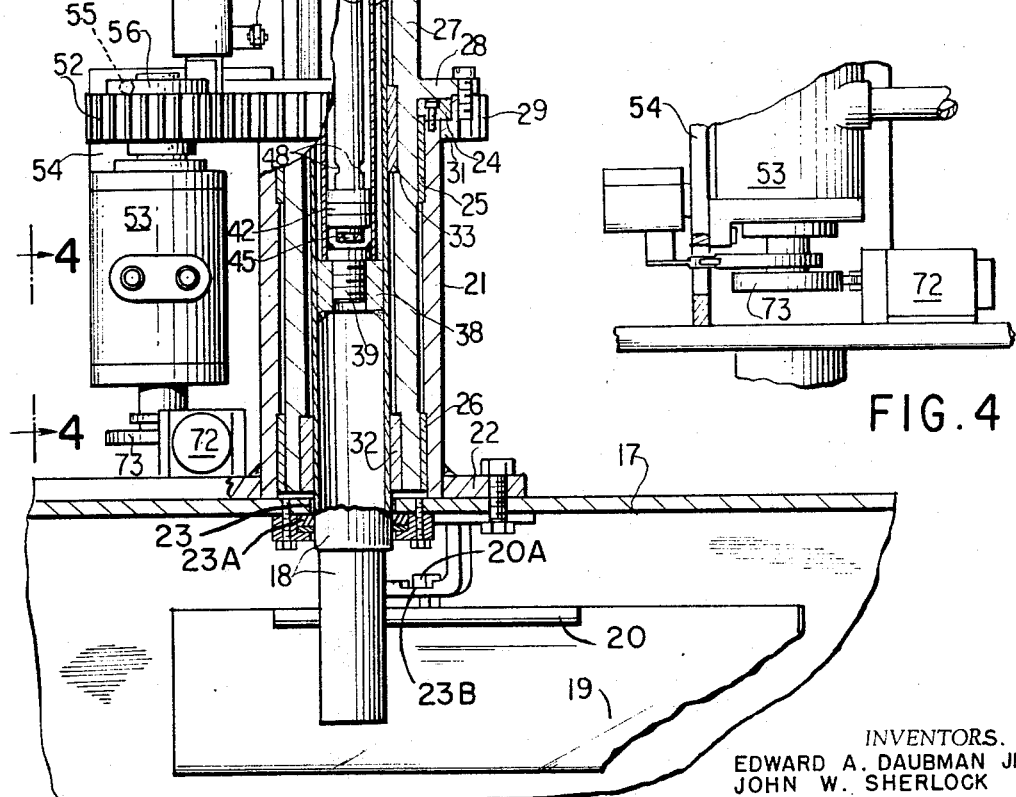

INVENTORS.
EDWARD A. DAUBMAN JR
JOHN W. SHERLOCK
BY
Robertson Smythe & Bryan
ATTORNEYS.

Oct. 18, 1966  E. A. DAUBMAN, JR., ETAL  3,279,613
CENTRIFUGALS

Filed Nov. 10, 1964  4 Sheets-Sheet 4

INVENTORS
EDWARD A. DAUBMAN JR
JOHN W. SHERLOCK
BY
*Robertson Smythe & Bryan*
ATTORNEYS.

United States Patent Office 3,279,613
Patented Oct. 18, 1966

3,279,613
CENTRIFUGALS
Edward A. Daubman, Jr., and John W. Sherlock, East Moline, Ill., assignors to Ametek, Inc., New York, N.Y., a corporation of Delaware
Filed Nov. 10, 1964, Ser. No. 410,117
1 Claim. (Cl. 210—375)

This invention relates to centrifugal separators and particularly to an improved unloading mechanism for centrifugal separators.

Rack and pinion means heretofore have been employed to raise and lower plow blades along the inner side wall of the rotating basket of centrifugal separators to remove the cake therefrom and to direct it toward a center bottom discharge of such separators. If the rack teeth extend into the housing of the separator, it is virtually impossible to provide an adequate seal around the rack bar, thereby permitting noxious fumes to leak from the separator housing. Furthermore, if the rack teeth are maintained outside of the separator, the overall height of the plow operating means becomes excessive. Additionally, if the rack teeth extend into the basket, the teeth become packed with cake which detrimentally affects the proper meshing of the gear teeth that mesh with said rack.

The principal object of the present invention is to provide an unloading device for a centrifugal separator in which a minimum overall height is required for the unloading device while still preventing the escape of noxious fumes from the separator.

Another object of the invention is to provide such a separator unloading device in which rack and pinion means are not employed to raise and lower the plow.

Another object of the invention is to provide a reciprocating and oscillatable tube which can readily be made of corrosion-resistant materials to resist the corrosive action of materials being processed in the machine.

Still another object of the invention is to provide such a separator unloading device in which oscillatable and axially movable fluid-operated means is employed to effect the movement of the plow.

Another object is to provide means for transmitting torque through a reciprocating member without introducing excessive sliding friction. Such would occur from a key sliding in a keyway.

Still another object is to provide such an unloading device in which control means is provided which prevents downward movement of the plow until it has been turned to cake removal position.

In one aspect of the invention, the centrifugal separator may comprise a housing having a basket provided with a perforated outer shell and mounted for rotation about a vertical axis within the housing. A discharge may be provided at the center of the basket, and the housing may be closed at the top by a cover plate through which may extend a vertically reciprocable shaft to the bottom end of which a plow may be fixed.

In another aspect of the invention, the plow is adapted to be turned toward and away from the inner periphery of the perforated basket by oscillating the vertically reciprocable shaft, through motor means, while the axial movement of the plow shaft is produced by a piston and cylinder device.

The above, other objects and novel features of the invention will become apparent from the following specification and accompanying drawings which are merely exemplary.

In the drawings:

FIG. 2 is an enlarged view, partly in section, of a portion of FIG. 1;

FIG. 3 is a sectional elevational view taken substantially along line 3—3 of FIG. 2;

FIG. 4 is an elevational view looking in the direction of the arrows along line 4—4 of FIG. 2;

Figure 1:
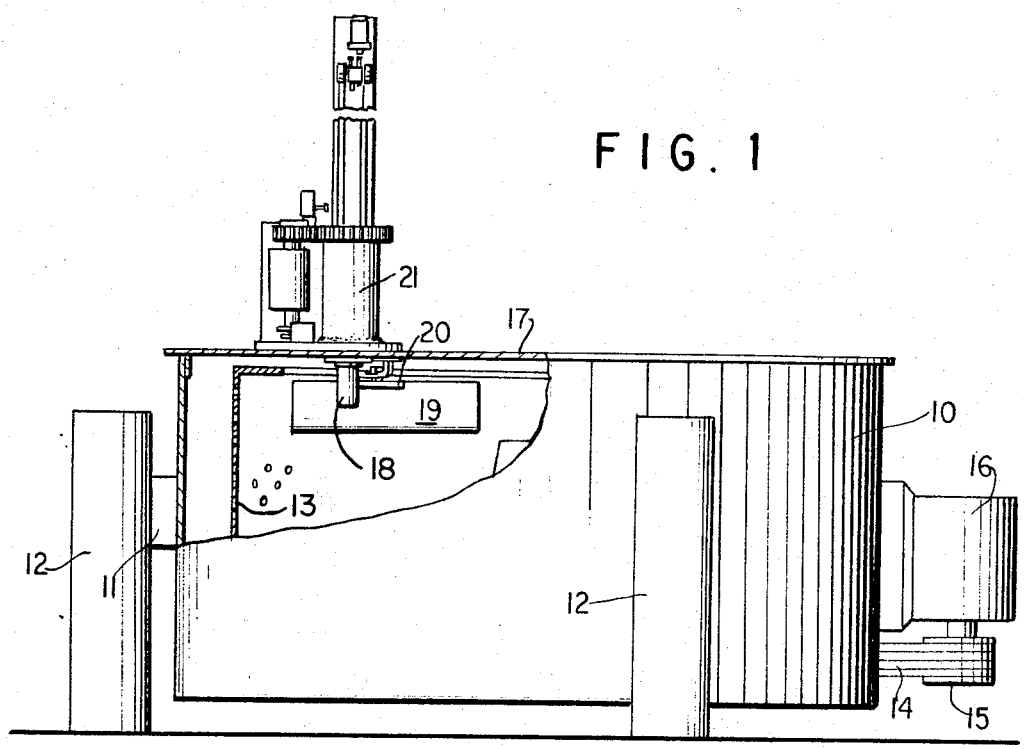
FIG. 1 is an elevational view of a centrifugal separator to which the principles of the invention have been applied.

Referring to the drawings, and particularly to FIG. 1, the principles of the invention are shown as applied to a centrifugal separator including a housing or shell 10 having brackets 11 (only one being shown) at three equally spaced locations about the shell 10. The brackets may extend into stanchions 12 and be connected to supporting structure therein capable of limited oscillatable movement to absorb vibrations.

A basket 13 having a perforated side wall may be mounted within the shell 10 for rotation about a vertical axis. It may be connected to a vertical spindle that extends to the outside of a bottom wall of shell 10, and which spindle supports a pulley driven by belts 14 that engage a pulley 15 fixed to the output shaft of a motor 16 mounted on the side of shell 10.

Shell 10 may be provided with a cover plate 17 which may include means for feeding through it into basket 13, a slurry to be centrifuged. Also, extending through cover plate 17 may be a shaft 18 to which is connected a plow blade 19 by a support plate 20.

Referring to FIG. 2, a tubular member 21 may be provided with a bottom flange 22 that is bolted or otherwise fastened to cover plate 17 in a manner to cover an opening 23 therein. A seal 23A can be used. Such will wipe the shaft and will also seal against the escape of internal pressure in the machine. Member 21 may include a top flange 24, and bearings 25 and 26 may be located along its interior. Another tubular member 27 may be mounted within member 21 for oscillatable movement. Member 27 may inclued a flange 28 to which is fixed a ring gear 29 by bolts 30. The ring gear 29 may include an inwardly directed flange 31 that engages the underside of the flange 24.

Shaft 18 is tubular in form and is slidingly received by bearings 32 and 33 spaced along the interior of member 27. The tubular shaft 18 extends upwardly to near the top of the device and has fixed to its top, a bracket 34 (FIG. 3) that extends through an elongated slot 35 formed by a longitudinal portion of tubular member 27 being cut away, forming ways 36 and 37 for a purpose to be described later.

A threaded ring 38 may be welded or otherwise fastened within tubular shaft 18, and a threaded element 39, forming the bottom closure of a cylinder 40, may be threaded into ring 38. An axially fixed piston rod 41 having a piston 42 at its lower end may have its upper end fixed to the top of tubular member 27 by a transverse pin 43 (FIG. 3). The piston rod 41 is tubular in form and includes another tubular element 44 extending axially therethrough and opening into cylinder 40 below piston 42. The interior of the tubular element 44 is connected to a port 45 that is connected to a hydraulic supply and exhaust line.

The upper end of cylinder 40 is provided with an end wall 46 having a passage therethrough that slidingly receives the axially stationary rod 41. The annular space between rod 41 and element 44 is provided with a port 47 that is also connected to a hydraulic supply and exhaust line near the top thereof. Slightly above piston 42, transverse ports 48 extend through the wall of tubular rod 41. The construction is such that with port 45 open to supply and port 47 open to exhaust, liquid under pressure passes through tubular element 44, acting on closure 39, thereby forcing tubular shaft 18 and plow 19 downwardly. With port 45 open to exhaust and port 47 open to supply, the liquid passes down between elements 44 and 41, thence through ports 48, acting on the lower surface of wall 46, raising cylinder 40 together with tubular shaft 18 and plow 19.

The rod end of cylinder 40 is purposely mounted inside the tubular shaft 18 to protect the cylinder. The tubular shaft 18 may be made of a variety of corrosion-resistant materials.

Referring to FIGS. 2 and 3, the bracket 34 supports a shaft 49 on which rollers 50, 51 are journaled. Rollers 50, 51 roll along ways 36 and 37 formed by the cut-away portion of tubular member 27. Ways 36 and 37 may be removable (not shown) and could be fastened by screws. Also shims could be used to provide minimum clearance between the rollers and ways. In order to oscillate the plow 19 to bring it into cake cutting position and to return it to the position shown in FIG. 1, gear 29 meshes with a gear 52 fixed to the output shaft of a rotary hydromotor 53. The hydromotor 53 is a hydraulic motor of the vane construction providing a rotation of 280° or any selected portion thereof. A bracket 54, attached to the tube 21 and flange 22, includes an adjusting screw 55 adapted to cooperate with a cam 56 on the hydromotor shaft for preventing the plow blade 19 from engaging the inner surface of the basket wall 13. Furthermore, referring to FIG. 3, an adjustable screw 57 in bracket 34 is adapted to abut flange 28 to thereby limit the downward movement of shaft 18 and plow blade 19. Although a rotary hydraulic motor has been shown and described, it is evident that other types of motors may be used for oscillating the plow 19, as for example, a piston type motor could be connected to a crank arm that is attached to the flange 28.

Figure 5:
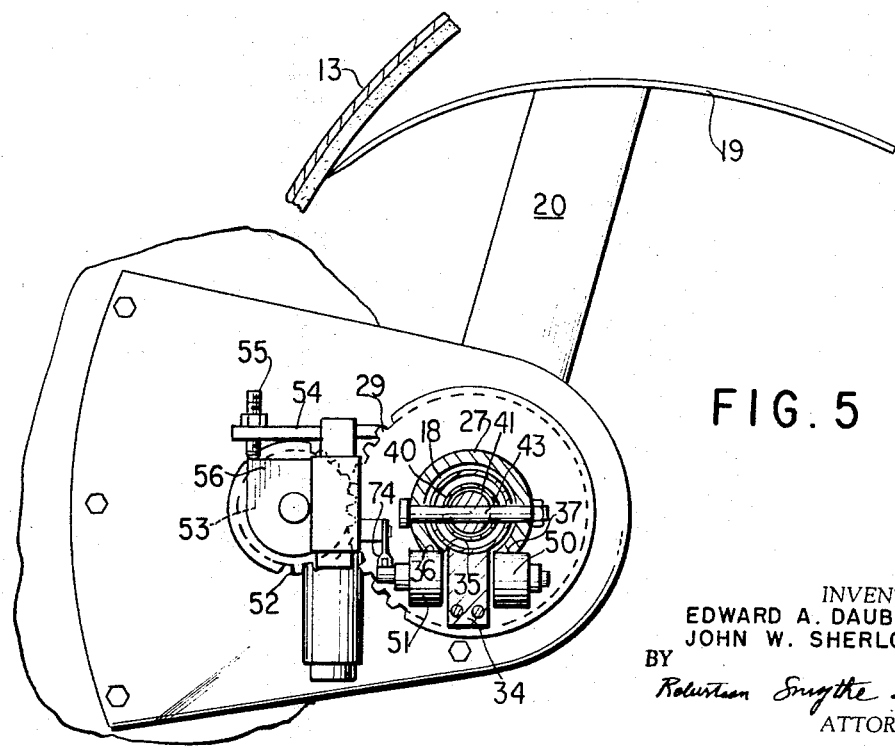
FIG. 5 is a plan view, partly in section, taken substantially along line 5—5 of FIG. 2.
Figure 6:
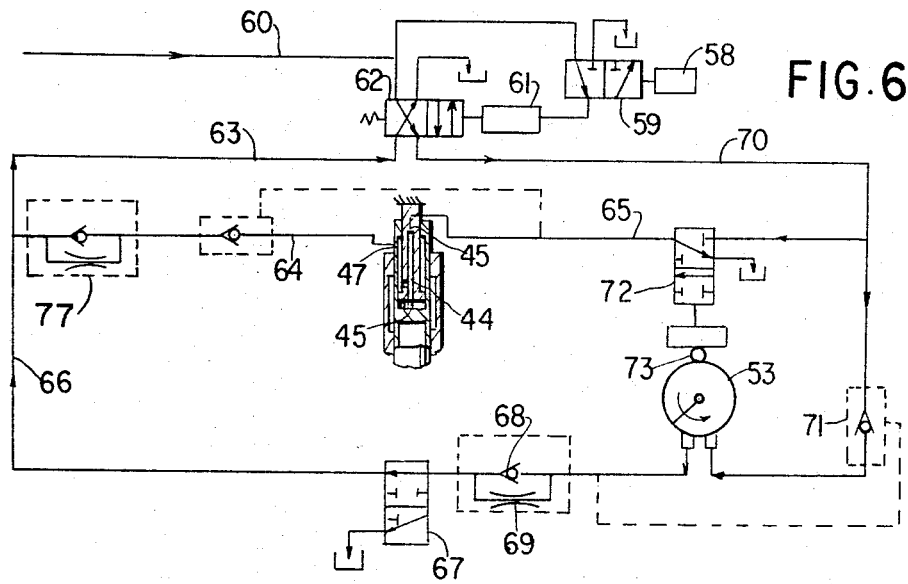
FIGS. 6 to 9, inclusive, are schematic diagrams of the hydraulic circuit for the apparatus shown in FIGS. 1 to 5.
Figure 7:
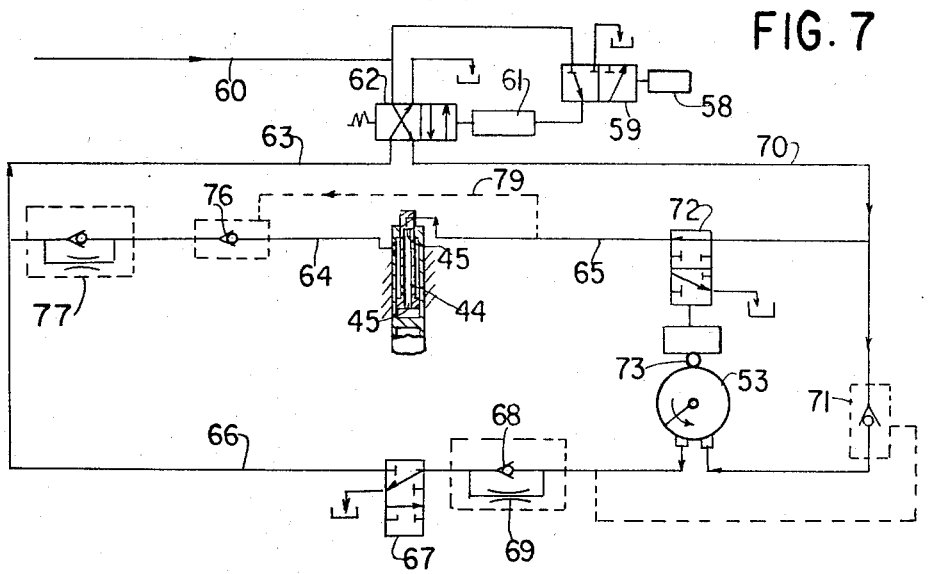

Normally, solenoid 58 (FIGS. 6 to 9) is de-energizer so that the plow 19 is in its raised position and turned inwardly toward the spindle of basket 13. When it is desired to remove the cake from basket 13, the cycle timer (or manual means, if desired) may be used to shift valve 62 to the position shown in FIGS. 6 and 7. If the cycle timer is effective, solenoid 58 is energized, shifting valve 59 to the position shown in FIG. 6, causing supply liquid to actuate hydraulic cylinder 61 to move valve 62 to the position shown in FIG. 6. Accordingly, supply liquid passes from the line 60 through valve 62 to line 70, thence through check valve 71, thence to hydromotor 53. Exhaust from hydromotor 53 passes through restriction 69, valve 67, lines 66, 63, valve 62 to tank. This rotates the plow 19 toward the side wall of basket 13 at a controlled rate due to the restriction 69. Accordingly, plow 19 moves into the cake until cam 56 hits stop 55 (FIG. 5). At this point, a cam 73 (FIG. 2) moves valve 72 to the position shown in FIG. 7. This causes pressure liquid to flow from line 70 through valve 72, port 45 and out 44, forcing shaft 18 and plow 19 downwardly. As cylinder 18 moves downward, adjustable screw 75 moves away from roller cam on valve 67, allowing valve 67 to shift to the position shown in FIG. 7. Pressure in line 65, through 79 holds pilot check valve 76 open so that exhaust oil from the rod end of cylinder 18 can be metered through restrictor valve 77 to control the rate of downward movement of the plow 19. When cylinder 18 and its shaft together with plow 19 have traversed fully downward, shaft 49 (extended) hits an arm 74 on a limit switch (FIG. 2), deenergizing solenoid 58.

Figure 8:
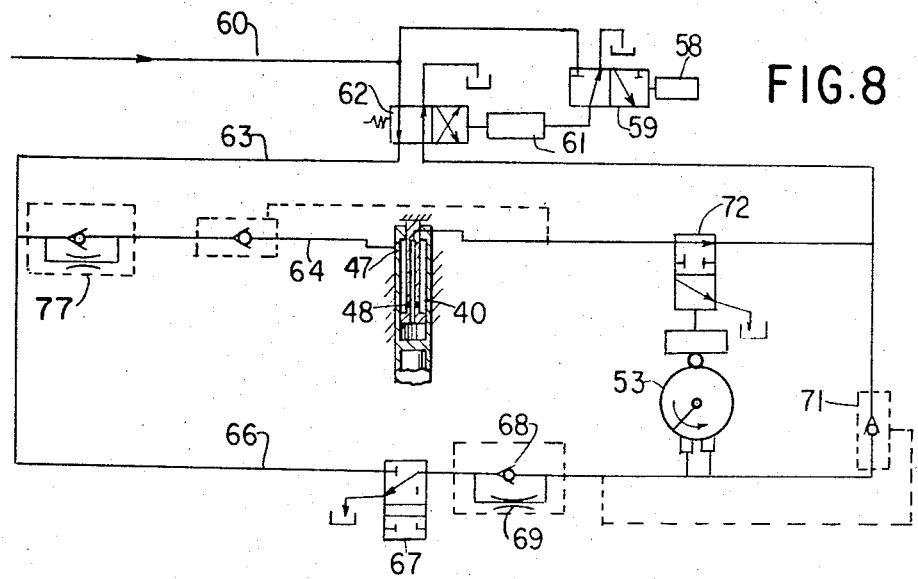
Figure 9:
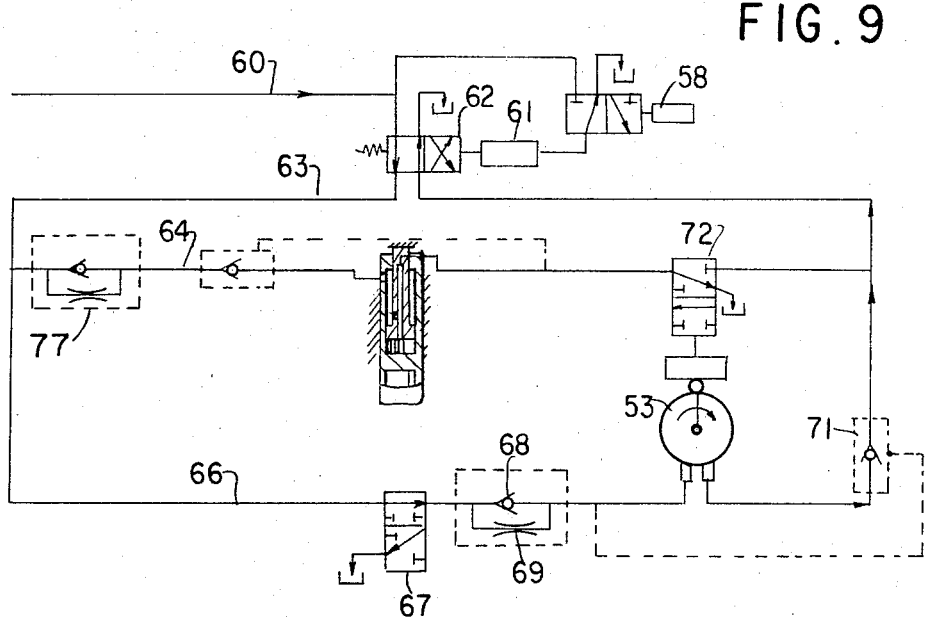

Deenergization of solenoid 58 causes valve 62 to move to the position shown in FIG. 8, whereupon pressure fluid flows from line 60 through valve 62, lines 63, 64, port 47 (FIG. 3), port 48 (FIG 2), raising cylinder 40 and with it, shaft 18 and plow 19. When the plow is at its upper limit, an adjustable screw 75 shifts valve 67 to the position shown in FIG. 9. This causes pressure liquid from line 66 to flow through valve 67, check 68 to hydromotor 53 to turn the plow 19 into the spindle of basket 13, where it remains until another cycle of cake removal is initiated.

Hook 23B can be used to prevent the plow from undesirably moving downwardly in the event of loss of pressure. A U-bolt 20A will engage hook means 23B when in the idle position.

Although the various features of the improved unloading device for a centrifugal separator have been shown and described in detail to fully disclose one embodiment of the invention, it will be evident that changes may be made in such details and certain features may be used without others without departing from the principles of the invention.

What is claimed is:

In a centrifugal separator, a housing; a basket having a side wall through which liquid can be extracted under centrifugal force, said basket being mounted for rotation about a vertical axis; a cover for said housing; a plow within said basket, said plow being connected to one end of a reciprocable hollow shaft having an uninterrupted smooth surface throughout its entire extent and passing through said cover; a tubular member surrounding said hollow shaft and mounted for rotational oscillation therewith on said cover, but fixed against reciprocable motion relative to said hollow shaft; a longitudinal portion of said tubular member being cut away to form parallel guide ways therealong; roller means mounted on said hollow shaft and engaging said guide ways; a hollow cylindrical member having a closed bottom within said hollow shaft and affixed thereto, piston and cylinder means within said cylindrical member, the cylinder means being connected to said tubular member and said piston being connected to said cylinder means; hydraulic motor means for oscillatably rotating said tubular member; and means for admitting and exhausting pressure liquid to said piston and cylinder means to effect reciprocable movement of said hollow shaft and said hollow cylindrical member.

References Cited by the Examiner

UNITED STATES PATENTS

| | | | |
|---|---|---|---|
| 2,642,997 | 6/1953 | Tompkin | 210—375 X |
| 2,755,991 | 7/1956 | Tholl et al. | 210—375 X |
| 3,038,611 | 6/1962 | O'Conor et al. | 210—376 X |

REUBEN FRIEDMAN, *Primary Examiner.*

J. DE CESARE, *Assistant Examiner.*